March 6, 1951 R. L. PEASE 2,544,102

RECEIVING APPARATUS FOR RADIO SIGNALS

Filed Aug. 31, 1949

INVENTOR.
Richard L. Pease
BY
Arthur P. Woolfolk
Attorney

Patented Mar. 6, 1951 2,544,102

UNITED STATES PATENT OFFICE 2,544,102

RECEIVING APPARATUS FOR RADIO SIGNALS

Richard L. Pease, Wauwatosa, Wis.

Application August 31, 1949, Serial No. 113,330

1 Claim. (Cl. 179—1)

This invention relates to a receiving apparatus for radio signals.

In receiving radio signals, for example those received by pilots of airplanes, it is highly desirable that the intensity of the signal be regulated to the exact needs of the pilot so that the over-all noise or background noise may be kept as low as possible, and thus the relative intensity of the signal with respect to the background noise may be enhanced.

In addition to this, it is desirable to eliminate external noises such as the roar of the motors of the plane and from vibration from parts of the airplane. The usual procedure is to wear ear caps which enclose the ears of the pilot, but these have been found to have objectionable features in that they are extremely cumbersome, are hot to wear, and do not eliminate the external noises. In addition to this, there is no means of increasing the direct transmission of the radio signal to the auditory canal of the ear.

It has been found that the small ear phones or receivers which are equipped with molded plastic heads to fit closely into the auditory canal of the ear require a smaller volume of sound or, in other words, a signal of less amplitude in order to have the same audible effect on the pilot. However, no means has been provided for controlling the intensity of the transmitted sound effectively and the pilot, therefore, is subjected to an intense disturbance due to background noises when an attempt is made to regulate the volume through the regular volume controls of the radio receivers. In addition to this, where there is a pilot and a co-pilot both listening to the radio signal, it frequently happens that the required intensity for the two pilots is different and no means heretofore has been provided for individually adjusting the volume for the separate pilots.

This invention is designed to overcome the above noted defects and objects of this invention are to provide an extremely simple and highly effective apparatus which consists primarily of a novel form of plug and volume control formed as a unitary structure and arranged to be plugged into the ordinary jack of a radio receiver for an airplane, for instance, and which is directly connected to an ear phone arranged to transmit the sound directly to the auditory canal of the pilot's ear, and to so arrange the apparatus that the pilot has individual control of the volume for his particular ear phone without disturbing the volume for any other ear phone connected to the radio receiver.

A further specific object of this invention is to provide a novel form of combined plug and volume control rheostat which is made as a unitary structure and is connected to an ear phone and which is so made that it may be plugged into an ordinary radio receiver without requiring any alteration of the internal wiring or any other part of the receiver itself and which provides for the individual control of the volume for that particular ear phone to which it is directly connected.

Embodiments of the invention are shown in the accompanying drawings, in which.

Figures 1, 2:
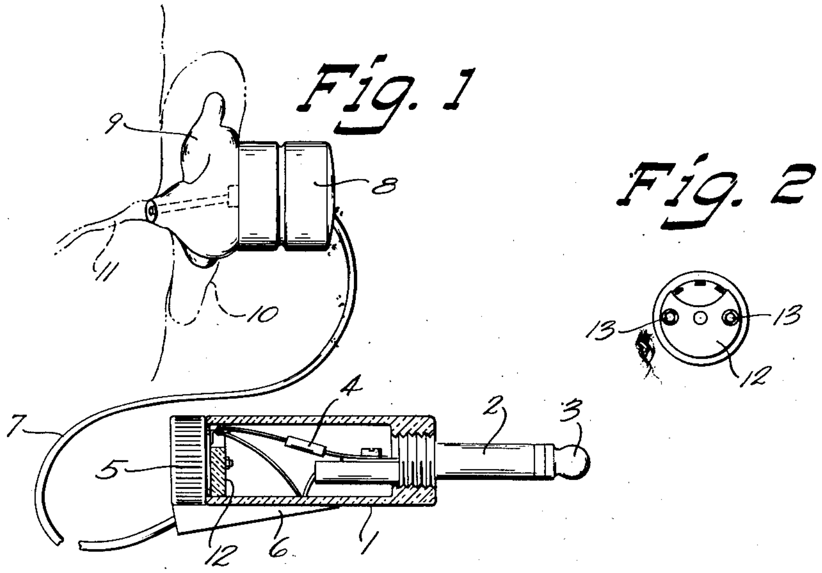
Figure 1 is a view showing the ear phone in place, the ear being shown in dotted lines and showing the plug with its major portion in section.
Figure 2 is a view looking from the right-hand side of the rheostat, with the rheostat removed from the plug.

Referring to the drawings, it will be seen that the plug comprises the usual hollow insulating body portion 1, the connecting tubular portion 2 and the knob 3. Within the hollow body of the plug, a limiting resistor 4 is positioned and the inner end of a volume control rheostat 5 fits into and closes the outer end of the hollow or tubular insulating body portion 1 of the plug. The plug is provided with a rib 6 through which the cord 7 to the ear phone 8 extends, so that the cord is located a slight distance to the side of the rheostat 5. The ear phone 8 is provided with a molded plastic or other head 9 which fits within the ear of the user, such ear being indicated in dotted lines by the reference character 10. The ear phone communicates directly with the auditory canal 11 of the user's ear.

A convenient way of mounting the rheostat 5 is to secure a small, substantially circular, insulating block 12 to the inner side of the rheostat by means of the mounting bolts 13 of the rheostat. This insulating block 12 is then cemented or otherwise secured within the outer end of the tubular body portion 1 of the plug.

Figure 3:
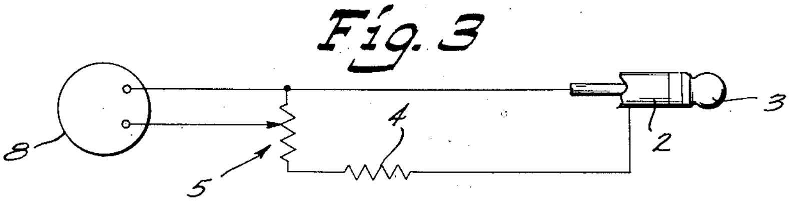
Figures 3 and 4 are wiring diagrams showing different modes of connecting the plugs with the ear phones.
Figure 4:
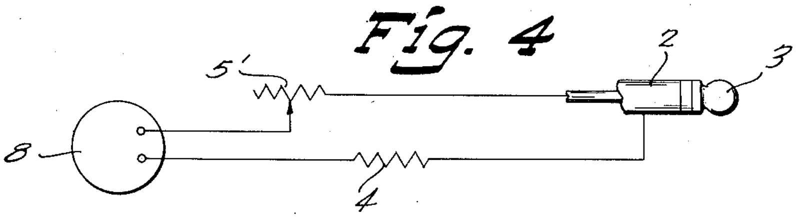

The rheostat 5 may be connected as shown in Figure 3, or in place of this, a series rheostat 5', as shown in Figure 4, can be employed.

Figure 5:
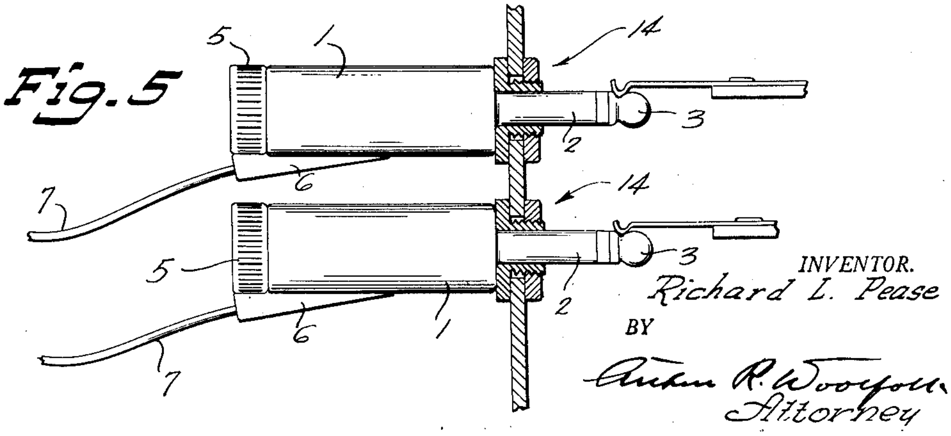
Figure 5 is a fragmentary view partly in section showing the manner in which two separate and individually controlled plugs may be used with the same radio receiver.

In using the apparatus, the plug is merely plugged into the usual jack indicated generally by the reference character 14 of the radio receiver and the rheostat 5 is adjusted for the particular volume desired by the pilot. In the event the co-pilot also requires an ear phone, a second plug may be plugged into the receiver as shown in Figure 5.

It will be seen that each pilot may individually control the volume for his particular ear phone.

Further it will be seen that the volume required is much less than that required where the ordinary ear cups are employed as the sound is fed directly to the auditory canal of the user's ear. It has been found by extensive experimentation with this apparatus, that the actual volume is extremely small and that the background noise decreases more rapidly than the signal as the volume of the signal is cut down. It is a well known fact that when radio receivers are turned up for a loud volume, that the background noise increases more rapidly than the signal. It is necessary, as a rule, to have the radio receivers of airplanes set at a fairly high volume. However, by the use of this invention the individual volume supplied the individual ear phones may be separately adjusted to as small a value as is comfortable for the pilot. It has been found also that with this particular arrangement, that the external noises are very much reduced as the auditory canal of the ear is closed by the corresponding portion of the head 3 of the ear phone. However, the pilot is not subjected to any hemorrhage of the diaphragm of his ear due to an excessively intense sound being fed directly to his auditory canal, as he is enabled to adjust his individual rheostat or volume control to his individual requirements.

In using the apparatus it is the customary practice to set the rheostat at minimum volume and then insert the plug and thereafter gradually increase the volume by an appropriate adjustment of the rheostat of the plug.

It will be noted further that the ear phone with its ear fitting head and the combined jack and rheostat are relatively small pieces of apparatus and the pilot is enabled to carry these in his pocket or in a suitable case, not shown, and always have them with him so that he can connect his apparatus to any radio receiver that may be employed with the particular airplane assigned him.

It will be seen further that the apparatus is extremely simple and that it may be cheaply produced and that it supplies a need that has not heretofore been supplied.

Although this invention has been described in considerable detail, it is to be understood that such description is intended as illustrative rather than limiting, as the invention may be variously embodied and is to be interpreted as claimed.

I claim:

A combined plug and volume control rheostat comprising an insulating hollow body portion provided with a conducting sleeve and knob projecting forwardly from one end of the body portion, a volume control rheostat closing the other end of the body portion and including a control knob rotatable about the longitudinal axis of said plug, said plug being cylindrical and control knob being of approximately the same diameter as said plug, and a conducting cord extending rearwardly from the body portion, said rheostat being electrically interposed between the cord and the sleeve and knob.

RICHARD L. PEASE.

REFERENCES CITED

The following references are of record in the file of this patent:

UNITED STATES PATENTS

| Number | Name | Date |
|---|---|---|
| 1,568,297 | Smalenberger | Jan. 5, 1926 |
| 1,733,579 | Coolbroth | Oct. 29, 1929 |
| 1,893,474 | Lieber | Jan. 3, 1933 |
| 2,186,072 | Huth | Jan. 9, 1940 |